Oct. 29, 1968  R. D. HASENBALG  3,407,895
SELF-CONTROLLED TRACTOR GUIDANCE SYSTEM
Filed Jan. 21, 1964  4 Sheets-Sheet 1

RALPH D. HASENBALG
INVENTOR.

BY *Robert Morris Field*

ATTORNEY

Oct. 29, 1968    R. D. HASENBALG    3,407,895
SELF-CONTROLLED TRACTOR GUIDANCE SYSTEM
Filed Jan. 21, 1964    4 Sheets-Sheet 3

INVENTOR.
RALPH D. HASENBALG
BY
ATTORNEY

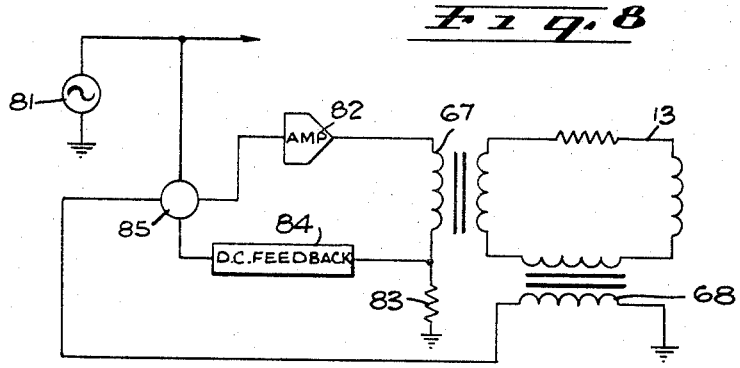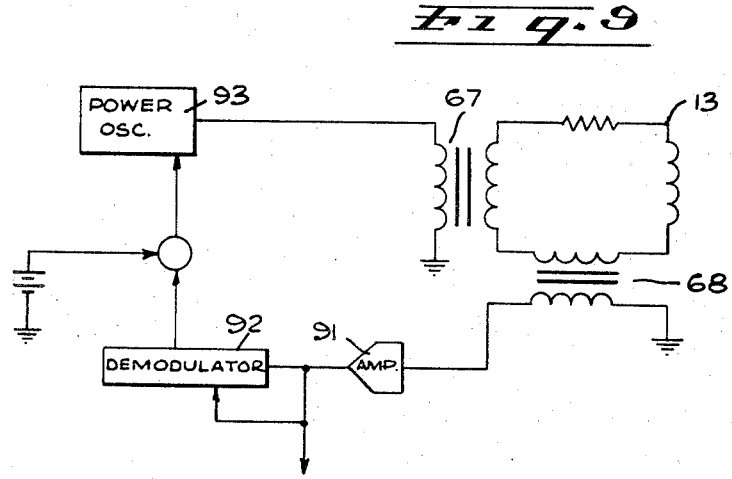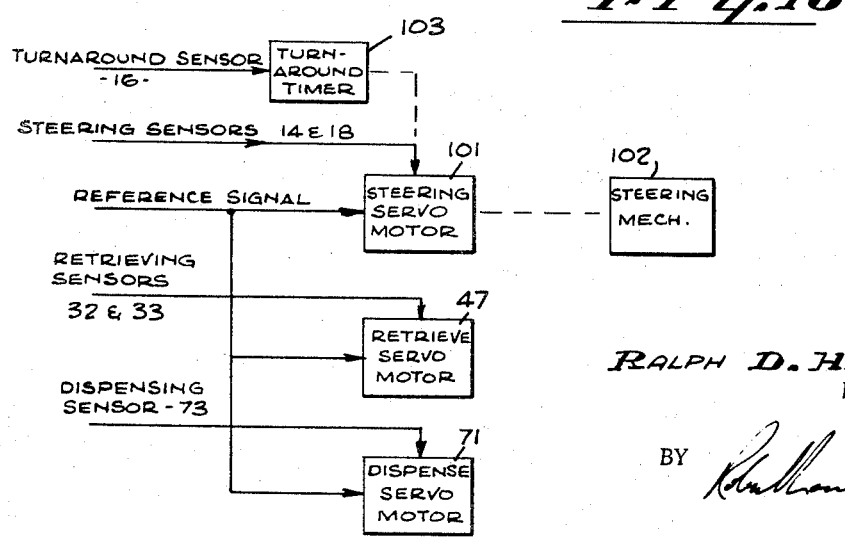

United States Patent Office 3,407,895
Patented Oct. 29, 1968

3,407,895
SELF-CONTROLLED TRACTOR GUIDANCE SYSTEM
Ralph D. Hasenbalg, Santa Susanna, Calif.
(8023 McLaren, Canoga Park, Calif. 91304)
Filed Jan. 21, 1964, Ser. No. 339,213
7 Claims. (Cl. 180—79)

This invention relates to self-controlled guidance systems and more particularly to a practical system for guiding and controlling a vehicle performing a routine operation such as for example, a farm tractor working in a field, and following consecutive paths, each parallel to and at a fixed distance from the previous path.

The art contains a variety of systems intended for vehicle guidance. Most of these systems require that wires, cables, tracks, switches or other controlling and guidance apparatus be buried, anchored in place, set up on stakes, or otherwise layed out in a more or less permanent preset pattern. The majority also requires a plurality of conductors, generally arranged in critically precise relationships, or a plurality of sensors, or both, in order to follow the predetermined path. One previous system utilizes a narrow trace of electrically detectable material of a fugitive type, such as water, deposited on the ground for continuously producing a new displaced guidance trace adjacent and substantially parallel to an existing controlling trace. This type of system can be used only under certain very limited conditions, and is particularly undesirable where the moisture will be absorbed by the ground or evaporated at a rapid rate, so that the trace is not detectable for steering the vehicle after the initial circuit of the field has been completed.

It is the intent and purpose of the subject invention to provide an improved self-controlled guidance system which will avoid the problems and defects inherent in these prior art systems.

Briefly stated, one preferred embodiment of this invention comprises a guidance system mounted on or towed by a vehicle including one or more phase-sensitive steering sensors connected to the vehicle's steering mechanism through a servo, and adapted to guide the vehicle to follow the magnetic field associated with an alternating current introduced by the system in a conductor which the vehicle itself automatically dispenses, recovers and stores as it progresses.

One object of the invention is to provide self-controlled means for automatically guiding a vehicle through a routine pattern without the need for complex, costly, difficult to maintain or easily damaged permanently installed wires, cables, trasks, guides or switches.

Another object of the present invention is to provide a flexible and highly reliable self-controlled guidance system for operating equipment in a routine pattern which progresses in a path or series of paths paralleling any desired initial course.

Other objects and many of the attendant advantages of this invention will be readily appreciated as the same becomes better understood by reference to the following detailed description when considered in connection with the accompanying drawings wherein:

FIGURE 8 is a schematic circuit diagram illustrating one preferred current induction servo system for controlling the amplitude and phase of the current introduced in the conductor;

FIGURE 9 is a schematic circuit diagram illustrating one modification of the current induction servo;

FIGURE 10 is a block diagram illustrating one preferred system for controlling the steering servo motor and steering mechanism as well as the retrieving and dispensing servo motors from their respective sensors.

Figure 1:
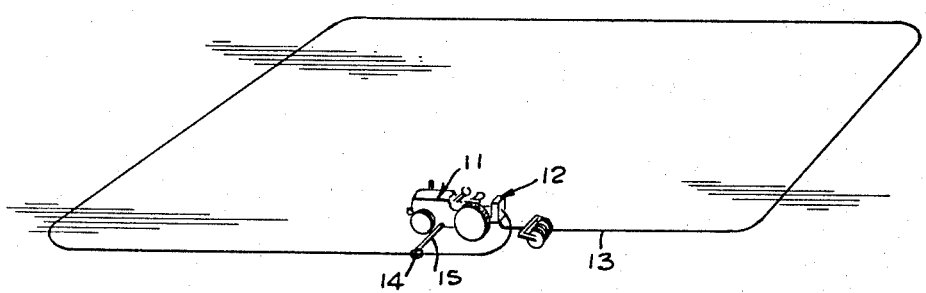
FIGURE 1 is a schematic view illustrating one preferred embodiment of the present invention wherein a tractor is operating in a diminishing pattern around a field.

Referring now to the drawings, and more particularly to FIGURE 1, one preferred embodiment of the present invention is illustrated wherein a tractor 11 is provided with suitable means 12 for storing, dispensing and retrieving an endless conductor 13.

A sensor 14, which may take the form of an electromagnetic field sensitive coil wound about an imaginary vertical axis, is mounted on a boom or arm 15 which extends outwardly from the tractor 11 generally parallel to the ground.

Figure 2:
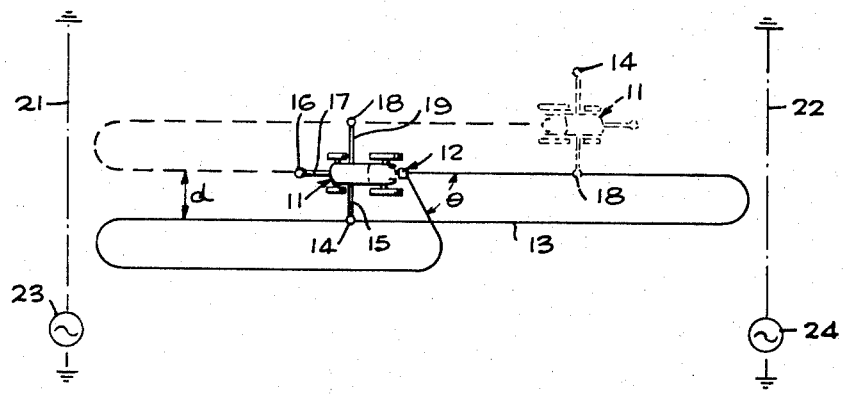
FIGURE 2 is a schematic diagram illustrating one modification of the present invention wherein a tractor is operating along a series of parallel paths from one end of a field to the other.

One modification of the present invention is illustrated in FIGURE 2 wherein tractor 11 is similar to the one shown in FIGURE 1 but is provided with an end of the field sensor 16 extending forwardly from the tractor 11 on a boom 17 and an additional steering sensor 18 mounted on the opposite side of the tractor 11 on the boom 19. With this form of the invention to provide a back and forth pattern, where the vehicle path advances laterally the distance $d$ on each pass across the field, it is necessary to provide a pair of conductors 21 and 22 at each end of the field which may be suspended on stakes or laid on the ground. Alternating current is generated through the conductors 21 and 22 by the alternating current sources 23 and 24 which use the ground or earth as a return.

The operation of the tractor 11 in the around-the-field pattern of FIGURE 1 and the back and forth pattern of FIGURE 2 will be described subsequently.

Figure 3:
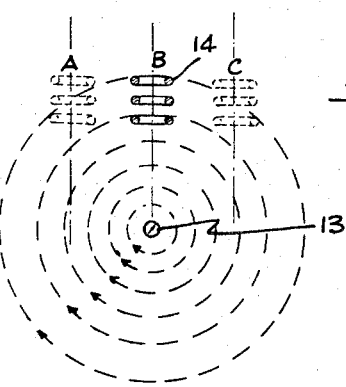
FIGURE 3 is a schematic sectional view illustrating the circular varying magnetic flux field which is generated around the conductor and three typical positions the sensor (shown schematically in cross-section) may occupy within the field during the operation of the vehicle.
Figure 4:
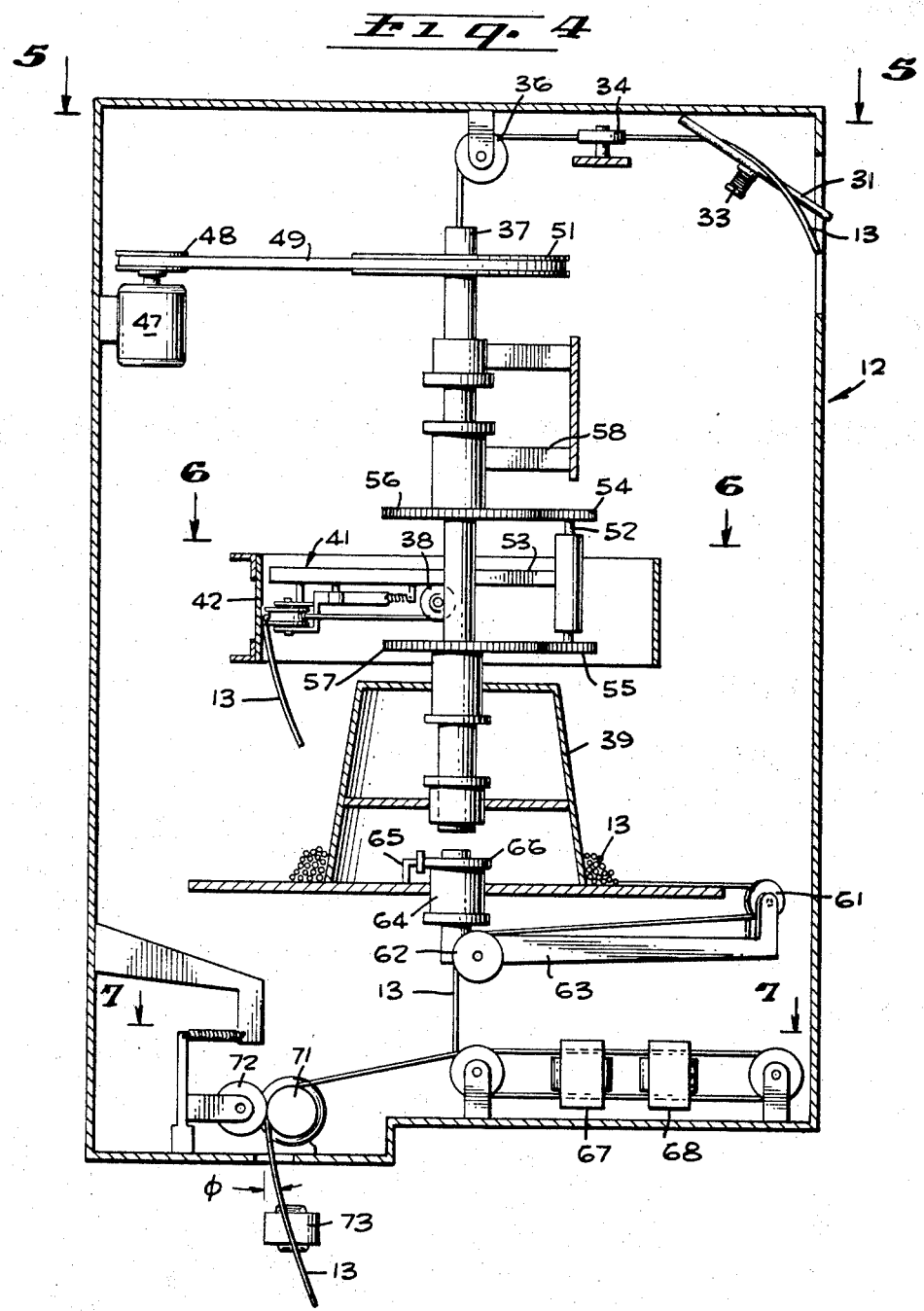
FIGURE 4 is a detailed view in section on an enlarged scale and illustrating one preferred form of retrieving and dispensing mechanism for use in the system of the present invention.

FIGURE 3 illustrates the relation between a typical single-coil sensor 14 and the magnetic field around the conductor 13.

When a conductor 13 carrying an alternating current is placed in a uniform medium such as air, a circular varying magnetic flux field is generated as shown in FIGURE 3. If a coil 14 is placed near the conductor with the extension of its imaginary central axis intersecting the conductor 13, as shown in position B of FIGURE 3, no magnetic flux will pass through the coil and hence no voltage will be developed therein. However, if the coil 14 is offset with respect to the conductor as suggested by positions A and C, flux will pass through and a voltage will be developed. The flux passing through the coil 14 in position C develops a voltage which is in phase opposition to that of position A, and the voltage developed at position A or B bears a fixed relationship to the phase of the current in the conductor. The amount of flux passing through the coil 14 and thus the voltage developed is a function of the distance between the sensor and the conductor. Hence, the location of the conductor relative to the sensor may readily be determined if the normal distance from the sensor to the plane of the conductor is known. As will be described later these characteristics of the sensing means of the subject invention may be utilized to operate separate servos for controlling the conductor, steering the vehicle and carrying on a variety of related tasks.

The means 12 for dispensing and retrieving the conductor 13 is illustrated in more detail in the enlarged sectional views of FIGURES 4, 5, 6 and 7.

In the retrieving operation conductor 13 passes over a sensing support 31 on which the two sensors 32 and 33 are mounted, between guide pulleys 34 and 35, over the pulley 36, and through the center of hollow shaft 37. The conductor 13 leaves the shaft 37 by passing around pulley 38 and is metered onto the storage drum 39 by spring loaded idler assembly 41 as it passes around the inside of metering race 42. The idler assembly 41 consists of a small pulley 43 rotatably mounted on an arm 44 which is rigidly secured to the hollow shaft 37. A larger pulley 44' is mounted on a pivoted bracket 45 and is resiliently urged against the metering race 42 by spring 46.

A motor 47 having a pulley 48 engaging belt drives a large pulley 51 rigidly mounted on the hollow shaft 37 for rotation thereof and the idler assembly 41, as well as a jack shaft 52 mounted on arm 53. The jack shaft 52 is provided with pinion gears 54 and 55 at opposite ends thereof which engage large spur gears 56 and 57. This arrangement acts to stabilize shaft 37 and furnish additional support for idler assembly 41.

Spur gear 56 is rigidly mounted on a stationary bracket 58, which is firmly secured to a support member (shown only in fragmentary section in FIGURE 4), and the spur gear 57 is rigidly attached to the storage drum 39. Drum 39 is supported on shaft 37 by means of bearings and is restrained from rotation and maintained in a fixed position relative to the tractor by the cooperative action of pinion gears 54 and 55 with the stationary spur gear 56 and spur gear 57. Naturally, alternative means such as sprockets and chains may be substituted for spur gears 56 and 57 and pinion gears 54 and 55 without deviating from the scope of the invention.

When the conductor 13 is needed it is pulled from the storage drum 39 over idler pulleys 61 and 62 which are mounted on a tension arm 63 which, being rotatably mounted in a bearing 64 at the bottom of the storage drum 39, revolves around the storage drum. A friction member 65 engages annular flange 66 mounted on the tension arm 63 to maintain tension on the conductor 13.

Conductor 13 is threaded around a series of pulleys and through a current induction transformer 67 and a current sensor 68 which impart and sense respectively the current in the conductor. The sensing output is used to control the reference phase of the servos, as well as to control the amplitude of the current induced into the conductor.

Power to dispense the conductor 13 is supplied by motor 71 as the conductor passes around pulley 71a affixed to its shaft and is held on contact therewith by idler 72. The conductor 13 passes by dispensing sensor 73 before it is laid upon the ground.

Obviously the configuration and arrangement of the retrieving, storage and dispensing apparatus and the current inducing transformers may be varied considerably. However, the provision of independent means for retrieving and dispensing the conductor, so that the length of conductor on the ground may be adjusted and the balance of the endles loop of conductor 13 stored on the vehicle, is considered to be an important aspect of the present invention.

While the current in the conductor 13 may be introduced by direct conductive means, it is preferable to induce the current in the conductor by means of the transformer 67. In either case it is necessary to control the amplitude and phase of the current in the conductor 13. This is preferably done by means of a current induction servo system, such as that illustrated in the schematic block diagram of FIGURE 8.

The provision of a current induction system permits current to be introduced continuously in an endless conductor. With this system no direct current path exists between the sources of current and the conductor. Therefore, the gain of the controlling servo must be increased from zero gain at DC to a value at the carrier frequency sufficient to control the phase and amplitude of the current in the wire for all expected conditions of operation.

Changes in the size and pattern of the operation require that the servo be stable for different values of resistance and inductance in the cable loop. At all times the Nyquist conditions for stability must be met as the gain increases above and decreases below unity.

One method for achieving stability as the servo increases above unity gain is to provide an auxiliary feedback path for low frequency with the proper characteristics to meet the Nyquist criteria. Stability as the loop decreases below unity gain may be obtained for all expected conditions of operation by inserting an inductance 68 in the cable loop. A winding placed on the inductor 68 may also be used as the cable current sensor. In the block diagram of one preferred control system embodying these characteristics as shown in FIGURE 8, a reference signal is provided by the signal generator 81 and applied to an amplifier 82, as well as to the servo motors in FIGURE 10.

The output from the amplifier 82 goes through the current induction transformer 67 and induces a current in the conductor 13. The current passes through a current sensing resistor 83 to ground, and the voltage across resistor 83 is applied through the DC feedback 84 to the amplifier 82. The voltage across the inductor and current sensor 68 is also applied to the amplifier 82 through the summing junction 85.

An alternate method for controlling the reference phase of the servos is shown in FIGURE 9. The current waveform sensed by the sensor 68 may be amplified by amplifier 91 and used for the reference phase signal. However, means must be provided to maintain the current amplitude constant for different conductor configurations. This method of phase control is somewhat different from the one previously described. Here the current waveform is used directly as the reference for the servos, whereas the earlier method maintained the cable current waveform in phase with the reference signal. Control of the current amplitude is accomplished by demodulating the amplified current waveform in demodulator 92 and using the demodulated signal for amplitude control of the power oscillator 93. The reference phase for this demodulation process, as well as for the rest of the servos, is obtained from the amplified current waveform.

The block diagram of FIGURE 10 illustrates one preferred embodiment of a system for controlling the steering servo motor 101, the retrieving servo motor 47 and the dispensing servo motor 71. Each of the servo motors receives a reference signal from the circuit shown in FIGURE 8, or the circuit shown in FIGURE 9 which acts as a phase reference with respect to the signals received from their respective sensors. These servo motors are actuated by the signals from their respective sensors in conjunction with the reference signal in a manner well known in the art.

The steering servo motor 101 is connected mechanically, hydraulically or otherwise to a conventional steering mechanism 102 for directing the tractor 11 along its proper path.

For operation of the vehicle in a closed pattern as shown in FIGURE 1, only one steering sensor is required. For operation in the back and forth pattern shown in FIGURE 2, two sensors must be used. FIGURE 10 illustrates this latter configuration.

As shown in FIGURE 10 steering sensors 14 and 18 are both connected to the steering servo motor 101. It will be understood, however, that the output of either of these sensors is capable of guiding the tractor 11 to the left or right depending on the phase of the signal sense. The turn-around sensor 16 shown in FIGURE 2 is connected through a turn-around timer 103 or similar relay type means for programming a 180° turn with radius $d$ at the end of each traverse of the field between the conductors 21 and 22.

Figure 5:
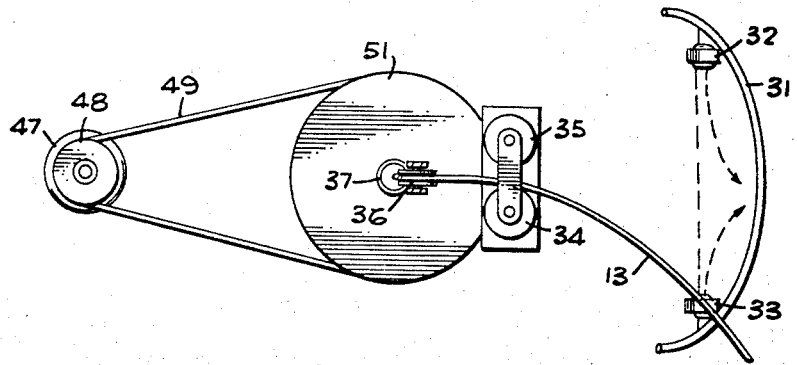
FIGURE 5 is a sectional view taken on the line 5—5 of FIGURE 4.
Figure 6:
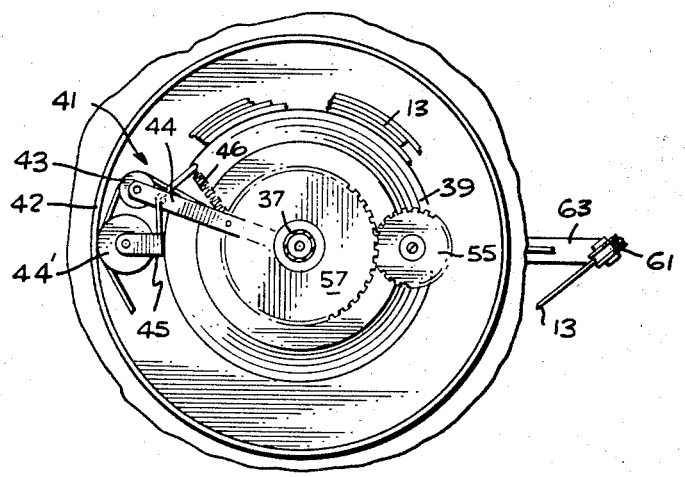
FIGURE 6 is a sectional view taken on the line 6—6 of FIGURE 4.
Figure 7:
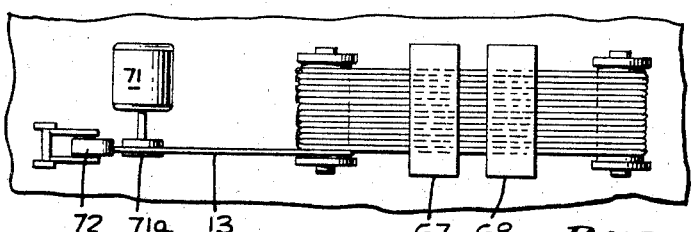
FIGURE 7 is a sectional view taken on the line 7—7 of FIGURE 4.

The retrieving sensors 32 and 33 as shown in FIGURE 5 are connected to the retrieving servo motor 47 for controlling the amount of cable or conductor 13 which is pulled in and metered onto the storage drum 39.

The output from the dispensing sensor is likewise connected to the dispensing servo motor 71 for controlling the amount of conductor 13 which is payed out and laid on the ground behind the tractor.

In the operation of the system of the present invention, as shown in FIGURE 1, the conductor 13 is laid out on the ground by manually steering the tractor 11 once around the periphery of the field or area which is to be worked. Sensor 14 is then positioned over the deployed conductor 13. As long as sensor 14 is maintained over conductor 13 the tractor will follow a spiraling pattern inwardly toward the center of the area.

In the operation of the system shown in FIGURE 2, the initial loop of conductor 13 would first be laid down across the field as illustrated by manual steering of the tractor.

In this latter configuration after the steering sensor 14 is positioned over the cable 13 the tractor 11 can then be started on automatic operation and will follow the cable 13 until the turn around sensor 16 picks up a signal from the cable 21. Control of the steering servo motor 101 will then be taken over by the turn around timer 103 and the tractor will execute a 180° turn to the right until the opposite steering sensor 18 picks up a signal from the conductor 13. The tractor will then follow the next parallel line of the conductor until the turn sensor 16 picks up a signal from the cable 22 and executes a 180° turn to the left. This pattern will continue until the end of the field is reached.

The retrieving means maintains a constant entrance angle $\theta$ of the conductor. As the vehicle advances the angle $\theta$ decreases causing a signal to be picked up by one of the two sensors 32 and 33 mounted on the sensing support 31. The two sensors 32 and 33 are connected in a manner such that any time the conductor 13 is between the two sensors on the sensing support a signal will command motor 47 to operate. The conductor will be metered onto the storage drum 39 and the angle $\theta$ increased until the conductor 13 is again adjacent to a sensor. Two sensors located as shown allow the vehicle to operate in either direction with no switching of sensors.

The dispensing means operates in a manner very similar. When the tractor advances, the angle $\Phi$ shown in FIGURE 4 increases causing a signal to be induced in the sensor 73. This signal is amplified and used to drive the motor 71, thereby demanding more wire from the storage drum and decreasing the angle $\Phi$. In this manner the conductor 13 is laid upon the ground under very slight tension and allows the vehicle to turn a corner without distortion of the pattern.

Virtually fail safe operation of the system may be assured by monitoring the operation of the guidance means and the vehicle performance. Several crucial performance points may be monitored as follows. The existence of a magnetic field can be determined by a coil mounted with its axis parallel with the magnetic field of the conductor and adjacent to the steering sensor. Faulty operation will be indicated by the continuous saturation of any servo. Various vehicle performance characteristics may be monitored for abnormal conditions also. Examples are: temperature, lubrication and developed power. Any indication of any abnormal condition will stop the operation and may even operate an alarm signal.

Obviously, many other modifications and variations of the present invention may be made within the scope of the following claims.

What is claimed is:

1. A self-controlled guidance system for an automotive vehicle comprising:
    (a) a conductor;
    (b) means for storing a portion of said conductor;
    (c) means for independently dispensing said conductor from said storage means;
    (d) means for independently retrieving said conductor and metering it onto said storage means;
    (e) sensing means travelling with the vehicle and adapted to be positioned in proximity to the dispensed portion of said conductor on the ground,
        said sensing means having an axis and being so oriented with respect to said conductor that no output signal is produced when said axis intersects the vertical plane containing said conductor and oppositely phased output signals are produced when said axis is displaced to either side of said conductor;
    (f) steering means connected to said sensing means for guiding said vehicle;
    (g) means for introducing an alternating current in said conductor whereby a magnetic field is generated around said conductor;
    (h) sensing means positioned adjacent said dispensing means for actuation thereof in response to a signal generated by proximity of said conductor;
    (i) sensing means positioned adjacent said retrieving means for actuation thereof in response to a signal generated by proximity of said conductor.

2. A self-controlled guidance system for an automotive vehicle comprising:
    (a) and endless conductor;
    (b) means for storing a portion of said conductor;
    (c) means for independently dispensing said conductor from said storage means;
    (d) means for independently retrieving said conductor and metering it onto said storage means;
    (e) sensing means travelling with the vehicle extending laterally of the vehicle and adapted to be positioned in proximity to the dispensed portion of said conductor on the ground,
        said sensing means having an axis and being so oriented with respect to said conductor that no output signal is produced when said axis intersects the vertical plane containing said conductor and oppositely phased output signals are produced when said axis is displaced to either side of said conductor;
    (f) means for steering said vehicle connected to said sensing means for guiding said vehicle parallel to said conductor;
    (g) means for introducing an alternating current in said conductor whereby a magnetic field is generated around said conductor;
    (h) sensing means positioned adjacent said dispensing means for actuation thereof in response to a signal generated by proximity of said conductor;
    (i) sensing means positioned adjacent said retrieving means for actuation thereof in response to a signal generated by proximity of said conductor.

3. A self-controlled guidance system for an automotive vehicle comprising:
    (a) an endless conductor;
    (b) means for storing a portion of said conductor;
    (c) means for independently dispensing said conductor from said storage means;
    (d) means for independently retrieving said conductor and metering it onto said storage means;
    (e) servo means for steering said vehicle;
    (f) means for introducing an alternating current in said conductor whereby a magnetic field is generated around said conductor;

(g) sensing means positioned adjacent said dispensing means for actuation thereof in response to a signal generated by proximity of said conductor;
(h) sensing means positioned adjacent said retrieving means for actuation thereof in response to a signal generated by proximity of said conductor;
(i) a plurality of sensing means connected to said servo steering means and extending laterally of the vehicle in proximity to the dispensed position of said conductor on the ground,
    each said sensing means having an axis and being so oriented with respect to said conductor that no output signal is produced when said axis intersects the vertical plane containing said conductor and oppositely phased output signals are produced when said axis is displaced to either side of said conductor.

4. A self-controlled guidance system for an automotive vehicle comprising:
(a) an endless conductor;
(b) means for storing a portion of said conductor;
(c) means for independently dispensing said conductor from said storage means;
(d) means for independently retrieving said conductor and metering it onto said storage means;
(e) servo means for steering said vehicle;
(f) a plurality of sensing means connected to said servo steering means and extending laterally of the vehicle on opposite sides thereof and end of the field sensing means extending forwardly of the vehicle;
    each of said laterally extending sensing means having an axis and being so oriented with respect to said conductor that no output signal is produced when said axis intersects the vertical plane containing said conductor and oppositely phased output signals are produced when said axis is displaced to either side of said conductor;
(g) means for introducing alternating current in said conductor whereby a magnetic field is generated around said conductor;
(h) sensing means positioned adjacent said dispensing means for actuation thereof in response to a signal generated by proximity of said conductor.
(i) sensing means positioned adjacent said retrieving means for actuation thereof in response to a signal generated by proximity of said conductor.

5. In a self-controlled guidance system for automotive vehicles the improvement comprising:
(a) an endless conductor;
(b) means positioned adjacent the path of travel of said conductor for introducing an alternating current in said conductor;
(c) means for storing a portion of said conductor;
(d) servo means for dispensing said conductor from said storage means;
(e) sensing means positioned adjacent said dispensing means for actuation of said dispensing servo means in response to a signal generated by proximity of said conductor;
(f) servo means for retrieving said conductor and metering it onto said storage means;
(g) sensing means positioned adjacent said retrieving means for actuation of said retrieving servo means in response to a signal generated by proximity of said conductor;
(h) sensing means travelling with the vehicle extending laterally of the vehicle and adapted to be positioned in proximity to the dispensed portion of said conductor on the ground;
    said sensing means having an axis and being so oriented with respect to said conductor that no output signal is produced when said axis intersects the vertical plane containing said conductor and oppositely phased output signals are produced when said axis is displaced to either side of said conductor;
(i) means for sensing the current in said conductor to provide a reference signal to said servo means.

6. In a self-controlled guidance system for automotive vehicles the improvement comprising:
(a) an endless conductor;
(b) means positioned adjacent the path of travel of said conductor for introducing an alternating current in said conductor;
(c) means for storing a portion of said conductor;
(d) servo means for dispensing said conductor from said storage means;
(e) sensing means positioned adjacent said dispensing means for actuation of said dispensing servo means in response to a signal generated by proximity of said conductor;
(f) servo means for retrieving said conductor and metering it onto said storage means;
(g) sensing means positioned adjacent said retrieving means for actuation of said retrieving servo means in response to a signal generated by proximity of said conductor;
(h) means for sensing the current in said conductor to provide a reference signal to said servo means.

7. In a self-controlled guidance system for automotive vehicles the improvement comprising:
(a) an endless conductor;
(b) a hollow shaft through which said conductor extends axially;
(c) retrieving servo means for rotating said shaft;
(d) means for guiding said cable into said hollow shaft;
(e) sensing means for actuating said retrieving servo means positioned adjacent said guidance means;
(f) a metering race mounted concentrically around said hollow shaft;
(g) an idler assembly mounted on said hollow shaft for rotation therewith and in contact with said metering race, said conductor passing out of said hollow shaft and over said idler assembly in contact with said metering race;
(h) a storage drum mounted below said metering race to receive any excess portion of said conductor;
(i) a tension arm assembly provided with guide pulleys and mounted to revolve around said storage drum with said conductor extending from said storage drum and over said pulley;
(j) means for introducing an alternating current in said conductor positioned adjacent the path of travel of said conductor;
(k) servo means for dispensing said conductor;
(l) sensing means for actuating said servo dispensing means positioned adjacent the path of travel of said conductor as it leaves said dispensing means;
(m) means for sensing the current in said conductor to provide a reference signal to said servo means.

References Cited

UNITED STATES PATENTS

| | | | |
|---|---|---|---|
| 2,317,400 | 5/1943 | Paulus et al. | 180—79.1 |
| 2,661,070 | 12/1953 | Ferrill | 180—82.1 X |
| 2,824,616 | 2/1958 | Knight et al. | 180—79 |
| 2,835,858 | 5/1958 | Moseley | 318—31 |
| 2,842,039 | 7/1958 | Swingle | 180—82 |
| 2,847,080 | 8/1958 | Zworykin et al. | 180—82 |
| 2,946,939 | 7/1960 | Lind | 318—31 |
| 3,009,525 | 11/1961 | DeLiban | 180—82 |
| 3,033,305 | 7/1962 | Harned et al. | 180—82 X |
| 3,128,840 | 4/1964 | Barrett | 180—79.1 X |
| 3,169,598 | 2/1965 | Finn-Kelcey et al. | 180—79 |
| 3,258,212 | 6/1966 | La Tour | 242—78.1 |

KENNETH H. BETTS, *Primary Examiner.*